J. F. ECCARD & J. SMITH.
TRAILER TRUCK.
APPLICATION FILED JAN. 2, 1913.
1,117,944.
Patented Nov. 17, 1914.
3 SHEETS—SHEET 1.
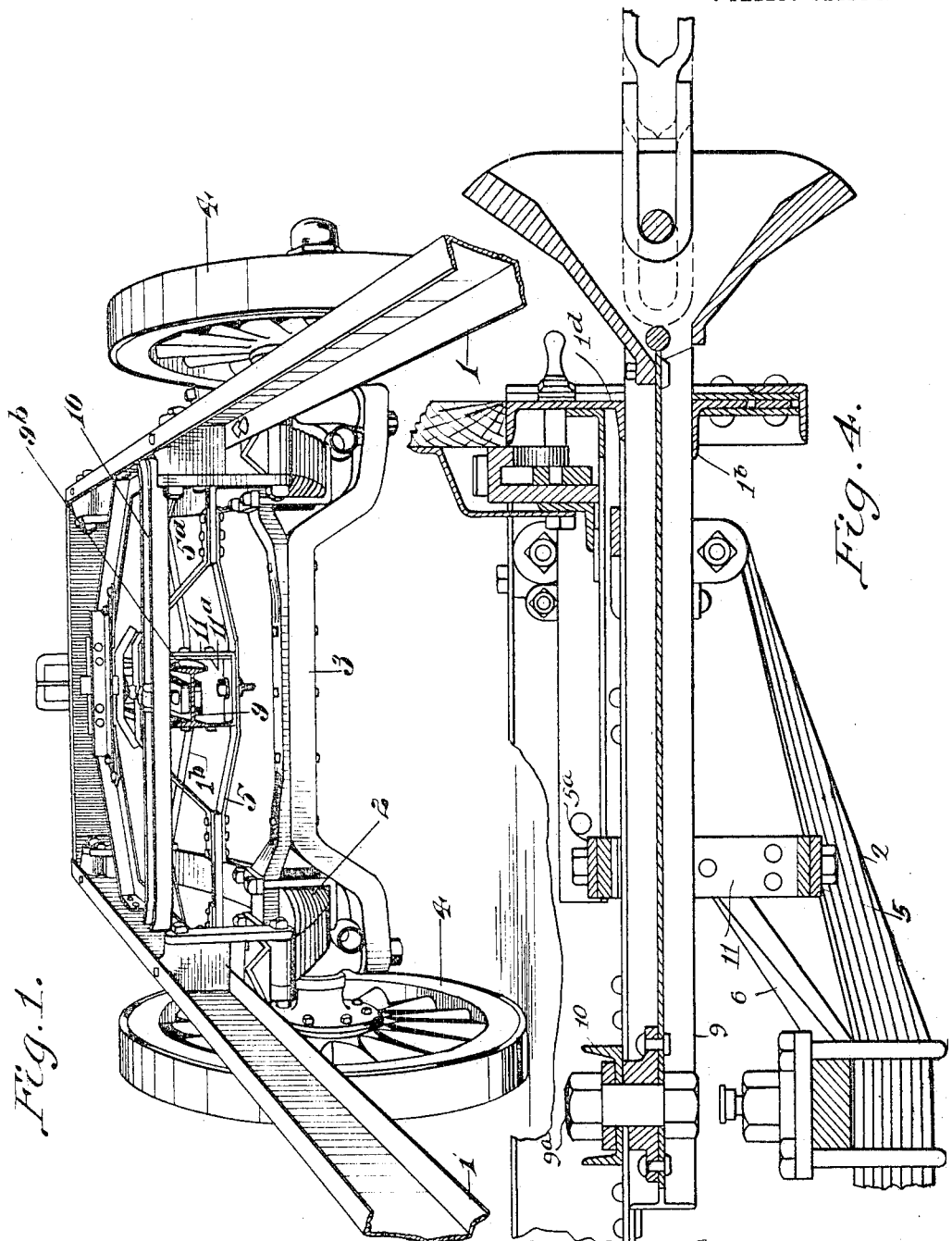

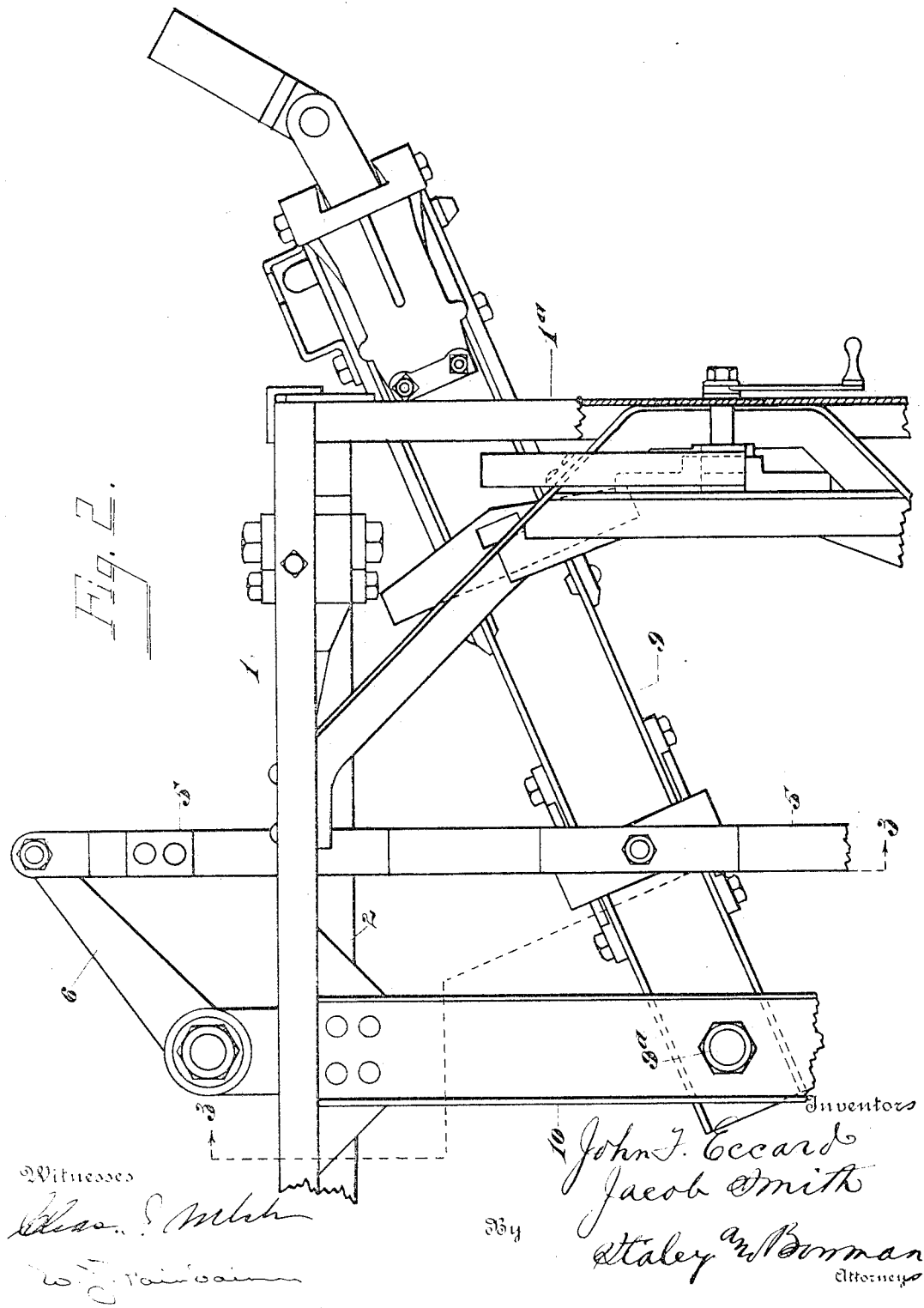

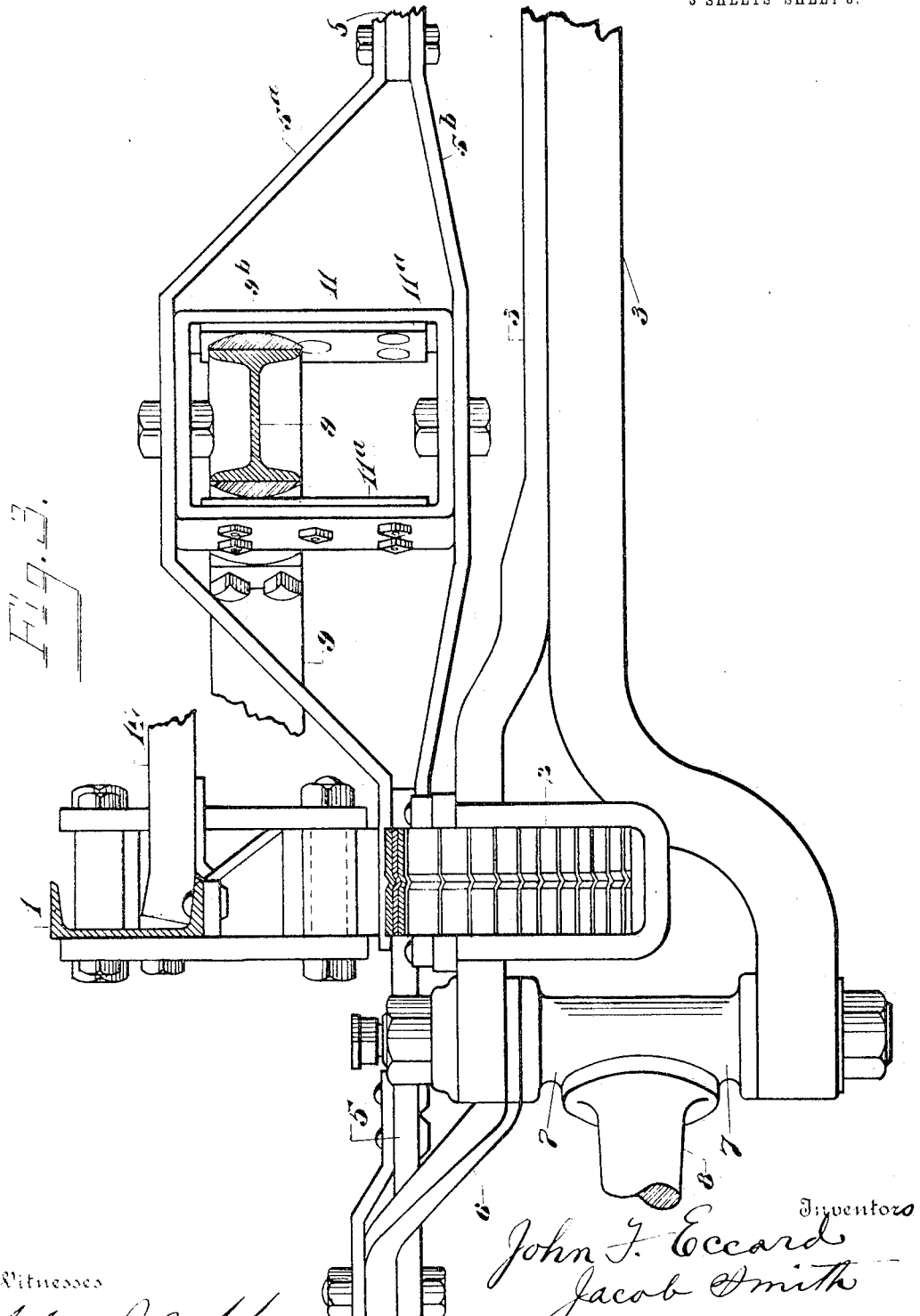

UNITED STATES PATENT OFFICE.

JOHN F. ECCARD AND JACOB SMITH, OF TROY, OHIO, ASSIGNORS TO THE TROY WAGON WORKS COMPANY, OF TROY, OHIO, A CORPORATION OF OHIO.

TRAILER-TRUCK.

1,117,944.      Specification of Letters Patent.      Patented Nov. 17, 1914.

Application filed January 2, 1913. Serial No. 739,860.

*To all whom it may concern:*

Be it known that we, JOHN F. ECCARD and JACOB SMITH, citizens of the United States, residing at Troy, in the county of Miami and State of Ohio, have invented certain new and useful Improvements in Trailer-Trucks, of which the following is a specification.

This invention relates to improvements in reversible trucks, some of the features being more particularly applicable to trucks or wagons designed to be drawn by motor vehicles and also particularly applicable to trucks wherein springs are employed between the bed and the axle.

In motor drawn trucks or vehicles and machines generally of this character it has been found desirable to mount the bed of the truck upon springs to compensate for the jar and shocks of the increased speed of travel and it has also been common to make the trucks and wagons of this type reversible in the sense that the vehicle may be drawn from either end. It has been usual to provide a draft-bar, which preferably must be capable of a swinging lateral movement in order to guide the wheels when the vehicle is being drawn from that end and the draft-bar is also made capable of being locked in a central position to the vehicle body when the wagon or vehicle is being drawn from the opposite end.

One of the main objects of this invention is to so arrange the various parts as to allow for a vertical movement, a swinging movement, a longitudinal movement and a torsional movement of the draft-bar with respect to its connection with the wheels and considerable difficulty has been experienced in making a practical construction where there is considerable relative movement between the bed of the wagon and the ends of the axle and guide connections by reason of the necessity of taking care of the vertical, longitudinal, swinging and torsional movement of the draft-bar in relation to its connection to the wheels.

Important features of this invention are that one of the wheels may be raised or lowered and the bed of the wagon may, at the same time, move to some extent up and down and yet the torsional strains will be taken care of by the general construction illustrated herein.

The general construction consists in having preferably semi-elliptic springs of the ordinary type employed in the vehicles of this class located between the bed of the vehicle and each end of the axle and having the wheels mounted on rotatable spindles. Preferably a transverse member is employed between the rotatable spindles and the swinging draft bar and a connection is formed on said transverse member such as to provide for the lateral swinging and torsional movement of said draft-bar and it is desirable that the draft-bar should also be supported near its front end by guides connected with the bed of the machine.

In the accompanying drawing: Figure 1 is a perspective view of one end of the vehicle showing the draft-bar in central position. Fig. 2 is a top plan view of a portion of the same showing the draft-bar swung to one side. Fig. 3 is a section on the line 3—3 of Fig. 2. Fig. 4 is a longitudinal section through a portion of the device with the draft-bar in central position.

Like parts are represented by similar characters of reference in the several views.

The trucks to which these improvements relate are preferably constructed exactly alike at each end, and in the drawings, therefore, there is illustrated one end only of the truck.

In the drawings, 1 represents the side members and 1ª one end of the main frame upon which the body (not shown) of the vehicle is mounted. This frame is supported upon springs 2, secured to the axle 3, in any suitable manner, the wheels 4, being swivelly connected to the respective ends of the axle in a well-known manner so that they may be turned with respect thereto for guiding purposes. To accomplish this, there is provided a transverse member 5, connected at its respective ends to the arms 6 projecting from the vertically arranged trunnions 7 of the spindles 8, upon which the wheels are journaled, and which are rotatably mounted in the bifurcated ends of the axle in the usual manner. The transverse member 5 is operated by a draft bar 9, pivotally connected at its rear end by the pivot bolt 9ª to a transverse frame member 10, and extending forwardly beyond the end of the vehicle so that it may be connected to the draft appliances when employed to draw the vehicle or may be locked to the main frame when the vehicle is being drawn from the other end, the draft bar being extended beneath the frame member 1ª and supported at its free end by the frame member 1ᵇ. This draft bar is common in vehicles of this character, but the manner of connecting the same with the steering member 5 and with the main frame and draft appliances, as the case may be, are the novel features of these improvements and will now be described.

The steering member 5 is bifurcated at its central portion, preferably by interposing in the central portion a frame composed of the pieces 5ª and 5ᵇ, and within this bifurcated portion is swivelly connected a rectangular open frame 11, through which frame projects the draft bar 9. The draft bar 9 may be formed of an I-beam or any other shape, and the sides at that point where it passes through the frame 11 are provided with hardened rounded plates 9ᵇ, fitted snugly between hardened plates 11ª on the inside of the frame 11. The result of this construction is that when the draft bar is being used for steering purposes, as the bar swings from side to side, it will move with it the member 5, the frame 11 swiveling in the bifurcated portion of the member 5, as indicated in Fig. 2. As the member 5 moves up and down in a vertical direction, due to the vibration of the spring-supported frame with respect to the axle and carrying wheels, the rounded shoes or plates 9ᵇ will slide upon the plates 11ª to permit of this. As torsional motion takes place in the draft bar, due to the possible alternate action of opposite springs or other causes, the rounded shoes will rock upon the plates 11ª. Therefore, it will be seen that the connection between the frame-supported draft-bar and the connecting rod 5, which is supported by the axle, is such that the draft bar and connecting member may have a swinging movement, a vertical movement, a longitudinal movement and a torsional movement, with respect to each other.

It is apparent that with a construction such that the bed can have considerable movement in its relation to the axle and the axle likewise considerable vertical movement in its relation to the bed, employing a swinging draft-bar supported on the bed, it is especially important that the various movements of the draft bar be provided for in the arrangements of the parts and to that end there has been illustrated a sliding form of connection between the draft-bar and the transverse member connected with the gear or axle part of the machine. In the various figures the sliding connection is preferably shown to consist of an open frame which is shown in vertical position, as for instance in Fig. 3 the open frame 11 is shown in vertical position with the guides or plates 11ª in substantially vertical alinement with the draft-bar 9. It is apparent, however, that if one of the wheels should be raised or lowered to any extent by reason of obstructions or depression in the surface being traveled over and for any other cause the transverse member 5 and the open frame 11 will assume a different position from that shown in Fig. 3, the plates 11ª instead of being in vertical alinement will readily be inclined to an angle to the vertical, and thereby the rounded shoe will rock on the plates or guides 11ª, but if during the time the open frame is in that inclined position the draft-bar is required to slide up and down in its relation to said frame by reason of any movement of the bed of the wagon in its relation to the axle, it will be apparent that the draft bar by this sliding movement will be brought in proper coöperative relation to said frame such that a line drawn through the center of the draft-bar perpendicular to the top surface of the draft-bar will be parallel with the line drawn perpendicular to the horizontal plane of the transverse member 5, or in other words the perpendicular line drawn through the center of the draft-bar will be parallel with the guides or plates 11ª. Therefore, the construction disclosed herein is one such that the draft-bar may have a sliding up and down movement in its relation to the transverse member in any position assumed by the transverse member without in any way interfering with the swinging movement of the draft-bar and likewise providing for the torsional movements and in a general way it may be said that there is such connection between the draft bar and the transverse member that a line drawn through the center of the draft-bar perpendicular to its horizontal surface will be parallel to the vertical line drawn perpendicular to the horizontal surface of the transverse member.

While the transverse member is shown as located in front of the axle, if desired it might be located at the rear thereof with the same results.

While the draft bar is shown supported entirely by the bed of the machine, it has a connection with the axle and wheels such that any lateral or swinging movement of the draft bar will be transmitted to the wheels, but said draft bar will not be affected by any relative movement of the frame and axle and therefore the springs can be employed without interfering with the operation of the draft bars.

Having thus described our invention, we claim:—

1. In a vehicle of the character described, a frame, an axle located below said frame, said frame being supported upon said axle so as to be capable of a movement relative thereto, carrying wheels swivelly connected with said axle, a draft-bar pivotally connected with said frame, a transverse steering member connected with said wheels, and a loose connection between said draft-bar and said transverse member to permit said bar and member to have relative movement with respect to each other.

2. In a vehicle of the character described, an axle, wheels swivelly connected with said axle, springs on said axle, a frame supported on said springs, a transverse member connected with said wheels, a draft bar pivotally connected with said frame and supported thereby, and a loose connection between said bar and member such that said bar may move said member in a transverse direction to steer said wheels but permitting vertical and torsional movements of said bar and member with respect to each other.

3. In a vehicle of the character described, an axle, wheels swivelly connected with said axle, a spring-supported frame upon said axle, a transverse member connected with said wheels, a draft bar pivotally connected with and supported by said frame, and a swiveled open frame carried by said member through which said draft bar loosely extends, whereby the movement of said bar is transmitted to said member for the purpose of steering said wheels.

4. In a vehicle of the character described, an axle, wheels swivelly connected with said axle, a spring-supported frame upon said axle, a transverse member connected with said wheels, a draft bar pivotally connected with said frame and supported thereby, a swiveled frame connected with said transverse member through which said draft bar extends and by which the movement of said bar is transmitted to said transverse member, the contacting surfaces between said bar and swiveled frame being such as to permit of a movement between said bar and transverse member to compensate for torsional movements of said frame with respect to said axle.

5. In a vehicle of the character described, an axle, wheels swivelly connected with said axle, a spring-supported frame upon said axle, a transverse member connected with said wheels, a draft bar pivotally connected with said frame and supported thereby, a swiveled member connected with said transverse member through which said bar extends and through the medium of which the movement of said bar may be transmitted to said member, the relation of said bar to said swiveled member being such as to permit of a vertical movement and also of a torsional movement between said bar and transverse member.

6. In a vehicle of the character described, an axle, wheels swivelly connected with said axle, a spring-supported main frame upon said axle, a transverse member connected with said wheels, a draft bar pivotally connected with said frame and supported thereby, and a swiveled frame connected with said transverse member and through which said bar extends, the sides of said bar having rounded faces adapted to contact the sides of said swiveled frame, for the purpose specified.

7. In a vehicle of the character described, an axle, wheels swivelly connected with said axle, a spring-supported main frame upon said axle, a transverse member connected with said wheels, a draft bar pivotally connected with said frame and supported thereby, a swiveled frame connected with said transverse member through which said bar extends, the sides of said bar having rounded surfaces adapted to contact with the sides of said swiveled frame, whereby the movement of said bar may be transmitted to said member but torsional movement of the parts with respect to each other permitted, the height of said swiveled frame being greater than the height of said bar to permit a vertical movement of the parts with respect to each other.

8. In a vehicle of the character described, a bed frame and axle, swiveled carrying wheels, springs between the frame and the axle, a draft-bar pivotally connected with the frame, a transverse member connected with the wheels, a connection between the draft-bar and said transverse member whereby a line drawn through the center of the draft-bar perpendicular to its horizontal surface will be paralled with a line drawn perpendicular to the transverse member, for the purpose specified.

9. In a vehicle of the character described, swiveled carrying wheels, with a frame supported upon said wheels, a transverse member connected with said wheels, springs between said wheels and said frame, a draft-bar pivotally connected with said frame, and a sliding connection between said draft-bar and said transverse member to take care of the various movements of said draft-bar in its relation to said transverse members, substantially as specified.

10. In a vehicle of the character described, swiveled carrying wheels, a frame, a draft-bar pivotally mounted on the frame, springs located between the frame and carrying wheels, a steering connection extending transversely from said wheels, and a connection supported upon said transverse steering device adapted to receive the draft-bar and capable of allowing for the swinging, longitudinal and torsional movement of said draft-bar, substantially as specified.

11. In a vehicle of the character described, swiveled wheels, a bed frame supported by said wheels, a draft bar pivotally mounted at its rear and slidingly supported by said bed frame at its front end, a transverse member connected with said wheels, and a loose connection between the draft bar and the transverse member for moving said member transversely to steer said wheels but permitting vertical, longitudinal and torsional movement of said bar and transverse member for the purpose specified.

In testimony whereof, we have hereunto set our hand this 26th day of December, 1912.

JOHN F. ECCARD.
JACOB SMITH.

Witnesses:
CHAS. A. GEIGER,
F. M. CHASE.